April 29, 1969   P. R. PICKELL   3,441,055
HYDRANT AND COOPERATIVE COUPLER VALVE
Filed July 5, 1966   Sheet 1 of 2

INVENTOR.
PHILLIP R. PICKELL
BY *Jack M. Wiseman*
ATTORNEY

April 29, 1969     P. R. PICKELL     3,441,055

HYDRANT AND COOPERATIVE COUPLER VALVE

Filed July 5, 1966     Sheet 2 of 2

INVENTOR.
PHILLIP R. PICKELL
BY Jack M. Wiseman
ATTORNEY

3,441,055
Patented Apr. 29, 1969

3,441,055
HYDRANT AND COOPERATIVE COUPLER VALVE
Phillip R. Pickell, Santa Clara, Calif., assignor of fifty percent to George S. Sanders, Santa Clara, Calif.
Filed July 5, 1966, Ser. No. 562,702
Int. Cl. F16k 1/04; F16l 37/22
U.S. Cl. 137—614.06                     9 Claims

ABSTRACT OF THE DISCLOSURE

A quick disconnect valve comprising two valve housing sections. A valve is disposed in one of the valve housing sections. In the other valve housing section is disposed means for opening and closing the valve. The housing sections are interlocked through a groove and locking balls arrangement. An actuator cams the locking balls into the locked and released position and also cams the valve opening and closing means in position. Specifically, the operation of the actuator first serves to lock the housing sections in the manner above described and continued operation thereof serves to open the valve. Conversely, the closing operation of the actuator serves to close the valve and continued operation thereof serves to release the housing sections from interlocked relation.

---

The present invention relates in general to valves, and more particularly to a valve of the quick disconnect type.

Quick disconnect valves are generally constructed of two sections, which may be quickly connected together, or disconnected from one another. One of the sections contains the valve elements, while the other section contains a valve actuating mechanism.

Heretofore, quick disconnect valves presented a number of disadvantages. One disadvantage being the tendency to drip, since on disconnection of the sections some liquid usually remains in one or both of the sections. A further disadvantage of the such quick disconnect valve is leakage between the valve sections during the operation of the valve.

Accordingly, it is an object of the present invention to provide an improved quick disconnect valve.

Another object of the present invention is to provide a quick disconnect valve which is drip-proof.

Still another object of the present invention is to provide a quick disconnect valve having an improved mechanism for interlocking the valve sections.

A further object of the present invention is to provide a positive method of discontinuing flow before unlocking and also to a positive method of locking before establishing flow.

Other and further objects and advantages of the present invention will become apparent to one skilled in the art from the following description, taken in conjunction with the accompanying drawings, in which.

Figure 1:
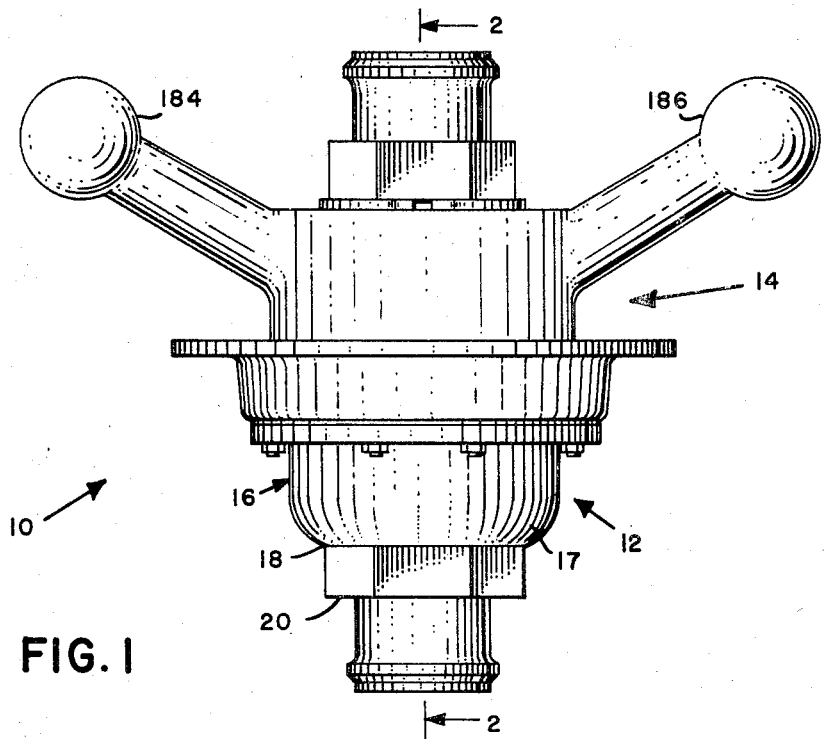
FIG. 1 is a side elevational view of a valve constructed in accordance with the invention.

In FIG. 1 there is shown a quick disconnect valve 10 constructed in accordance with the invention. The valve 10 is made up of an inlet assembly or receiving unit 12 and an outlet assembly or discharge unit 14.

The receiving assembly 12 (FIGS. 1–3), includes a generally cylindrical side wall 17. The side wall 17, at its inner end 18, is formed with an inlet 20, suitable for establishing a connection with a conduit, not shown. Mounted within the housing section 16 is a valve support member 22. The support member 22 is constructed of four radially extending arms 24 having respective outer ends 26 secured to the side wall 17. The arms 24 at their respective inner ends 28 support a hollow cylindrical guiding element 30.

Associated with the guiding element 30 is a valve member or poppet 32 constructed of a valve element 33 and a valve stem 34. The valve element 33 is of disc shape and is constructed of an inner metal disc 36, an outer metal disc 37, and a sealing gasket 38 positioned intermediate the discs 36 and 37. As shown in the drawings, the disc 36 is of a greater diameter than the disc 37. The gasket 38 is of such diameter that an edge portion 40 thereof projects outwardly beyond the respective side edges 41 and 42 of the discs 36 and 37. The valve stem 34 is of suitable diameter for seating within the guiding element 30 and for sliding movement within the latter. A spring 44 is mounted about the stem 34 and is compressed between the top surface 45 of the guiding element 30 and the undersurface 46 of the disc 36. The spring 44 thus constantly urges the valve element 33 in a direction away from the guiding element 30.

The side wall 17 terminates in a transversely extending peripheral flange 48. A sealing gasket 50 is positioned in abutment with the flange 48. Mounted on the flange 48 and in abutment with the gasket 50 is a ring 52. The ring 52 includes a radially extending circular base wall 54; and an axially extending circular side wall 56; and an axially extending circular center wall 58. The walls 54, 56 and 58 together define a channel 60. The ring 52 and the gasket 50 are secured to the flange 48 by means of suitable bolts (not shown), which pass through suitable apertures (not shown) in the wall 54 and through apertures 61 and 62 formed in the flange 48 and gasket 50, respectively.

The center wall 58 of the ring 52 is formed at the radially outward surface 63 thereof, adjacent the distal end 64, with a circumferential groove 66. The groove 66, in cross-section, is of the shape of a segment of a circle. The center wall 58 at the radial, inwardly facing surface 67 is formed with a circumferential groove 68 of rectangular cross-section. Mounted within the groove 68 is a sealing member in the form of an O-ring 69. The center wall 58, adjacent the inner end 70 thereof, is tapered to provide a seat 71 for the valve element 33. The side wall 56 of the ring 52, at the outer end 72 thereof, is formed with a peripheral mounting flange 73.

Positioned within the channel 60, and at the juncture of the base wall 54 and the side wall 56, are four equally spaced bosses 74 (two being seen). Each of the bosses 74 projects outwardly from the base 54 and inwardly from the side wall 56.

Figure 4:
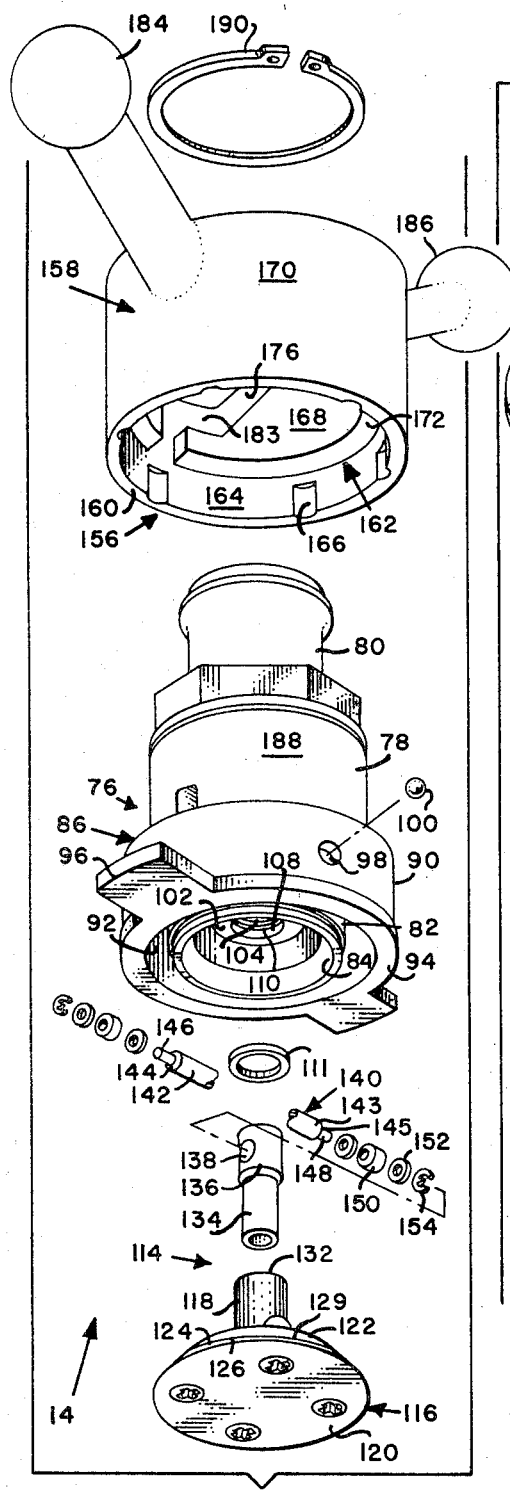
FIG. 4 is an exploded perspective view of another section of the valve of FIGS. 1–2.

The outlet assembly 14 (FIGS. 1 and 4) includes a hollow housing section 76, which provides a generally cylindrical side wall 78. The side wall 78, at the outer end 79 thereof, is formed with an outlet 80, suitable for establishing a connection with a conduit (not shown). The inner end portion 82 of the sidewall 78 is of reduced thickness and is tapered at the inner surface thereof, as seen at 84.

Mounted on the side wall 78 of the housing section 76, and adjacent the inner end 82 thereof, is an extension portion 86. The extension portion 86 is formed of a radial, outwardly projecting circular wall 88, which terminates in an axially inwardly projecting circular wall 90. The walls 88 and 90, together with the wall 78, define a channel 92. Projecting radially outwardly from the distal end 94 of the wall 90 are two diametrically-opposed tongues 96.

Formed in the wall 90 are a number of equally spaced circular apertures 98 (two being seen). In the exemplary embodiment, there are six apertures 98. Positioned within each of the apertures 98 is a locking ball 100. Each of the locking balls 100 is of such diameter that it can be inserted within the groove 66 in the wall 58 of the ring 52 and each of the apertures 98 is dimensioned so that the ball 100 therein can readily shift between a position of withdrawal from the channel 92 and a position of insertion into the channel 92.

Mounted within the housing section 76 is a guide member 102, which is secured to the side wall 78 by means of a plurality of support elements 104 (two being seen). In the exemplary embodiment, these use four support elements. The guide member 102 is formed with a generally cylindrical slideway 106. The slideway 106 adjacent the inner end 108 thereof is formed with a groove 110 of generally rectangular cross-section. Positioned within the groove 110 is a sealing ring 111. Communicating with the slidway 106 are two diametrically opposed and axially extending slots 112 and 113. Each of the slots 112 and 113 extends through one of the support elements 104 and, also, through the side wall 78.

A plunger 114, which is mounted for reciprocating movement within the housing section 76, is formed of a base or poppet 116 and a stem 118. The poppet 116 is of generally disc shape and includes an inner disc 120, an outer disc 122, and a sealing gasket 124 positioned intermediate the discs 120 and 122. The inner disc 120 is of somewhat greater diameter than the outer disc 122. The gasket 124 is of somewhat greater diameter than the disc 120, and thus provides an edge portion 126 which projects outwardly from the respective side edges 128 and 129 of the discs 120 and 122. The poppet 116 and the tapered surface 84 of the wall 78 are dimensioned so that the former can be seated within the latter. The inner disc 120 is of approximately the same diameter as the outer disc 37 of the valve element 33.

The stem 118 is secured to the outer surface 130 of the disc 122. The stem 118 is of hollow cylindrical shape and is formed adjacent its outer end 132 with internal screw threads (not shown). Inserted within the stem 118, at the outer end 132 thereof, is a screw 134. The screw 134 is provided with a cylindrical head 136, through which is cut a circular aperture 138. Supported by the head 136 and extending through the aperture 138 is a cylindrical pin 140. The pin 140 provides two opposite end sections 142 and 143 which are formed at their distal ends 144 and 145 with two cylindrical projections 146 and 148, respectively. Mounted on each of the cylindrical projections 146 and 148 is a cam follower in the form of a roller bearing 150. Each of the bearings 150 is positioned between suitable washers 152 and is maintained on the respective projections 146 and 148 by a snap-ring 154.

The plunger 114 is mounted so that the stem 118 thereof extends for reciprocating movement within the slideway 106 of the guide member 102. At the same time, the opposite end sections 142 and 143 of the pin 140 extend through the slots 112 and 113, respectively. The stem 118 is sealed within the slideway 106 by the sealing ring 112.

Associated with the housing 76 section is an actuator 156. The actuator 156 is constructed of a generally cylindrical side wall 158 having an inner end portion 160 of comparatively slight thickness and an outer end portion 162 of comparatively great thickness. The inner circumferential surface 164 of the inner end portion 160 is formed with a plurality of axially extending depressions 166 of curved cross-section, and corresponding in number to the number of apertures 98 in the wall 90 of the housing section 76. The depressions 166 have a positioning about the surface 164, which is the same as the positioning of the aperture 98 about the wall 90.

The outer end portion 162 of the wall 158 provides two opposite, parallel extending circumferential surfaces 168 and 170 having radial, inwardly facing and radial, outwardly facing positions, respectively. The outer end portion 162 also provides two opposite, parallel extending end wall surfaces 172 and 174, which face axially inwardly and axially outwardly, respectively.

Cut into the outer end portion 162, at the surface 168, are two diametrically opposed, radial inward slots 176 and 178. Each of the slots 176 and 178 extends angularly with respect to the end wall surfaces 172 and 174. Thus, the slots 176 and 178 have respective outer ends 180 and 182 positioned adjacent the surface 174; and respective inner ends 183 (one being seen) positioned adjacent the surface 172. The outer end 180 and inner end 183 of the slots 176 are positioned opposite the inner end 183 and outer end 182 of the slot 178, respectively.

Two handles 184 and 186 project outwardly from the surface 170. The actuator 156 slidably engages the housing section 76. Thus, the inner end portion 160 of the side wall 158 is mounted for sliding contact between the surface 164 thereof and the wall 90. The inner end surface 172 of the wall portion 162 slidably contacts the wall 88. The inner circumferential surface 168 of the wall portion 162 is slidable about the outer surface 188 of the side wall 78.

The two bearings 150 are positioned within the two slots 176 and 178, respectively. The plunger 114 is normally in the retracted position shown in FIG. 2, in which the poppet 116 is seated against the tapered surface 84 of the wall 78. The bearings 150 are then located within the outer ends 180 and 182 of the slots 176 and 178, respectively. Each of the depressions 166 is normally positioned in registry with one of the apertures 98.

The actuator 156 is maintained in its position of sliding contact with the housing section 76, as just described, by means of a snap-ring 190. The snap-ring 190 is positioned within a suitable groove 192 cut in the side wall 78 at the outer surface 188 thereof. The snap-ring 190 bears against the outer end surface 174 of the wall portion 162.

Figure 2:
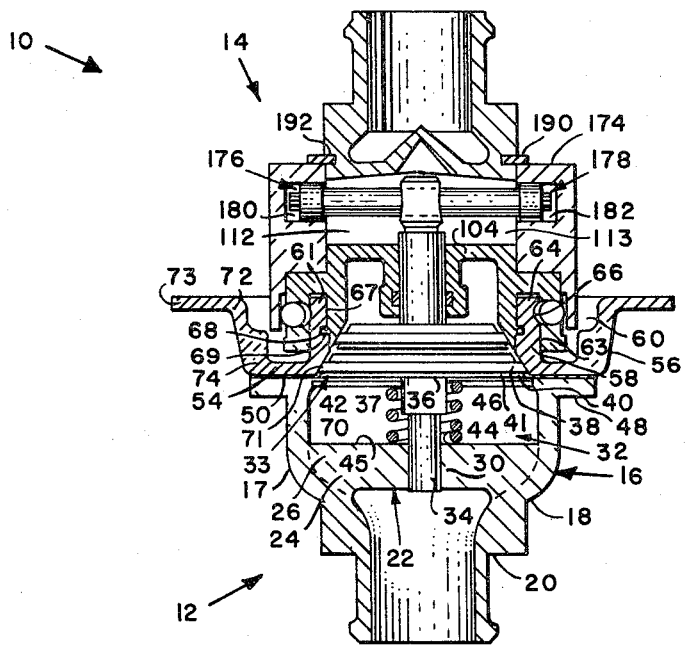
FIG. 2 is a vertical cross-sectional view taken along the lines 2—2 of FIG. 1.
Figure 3:
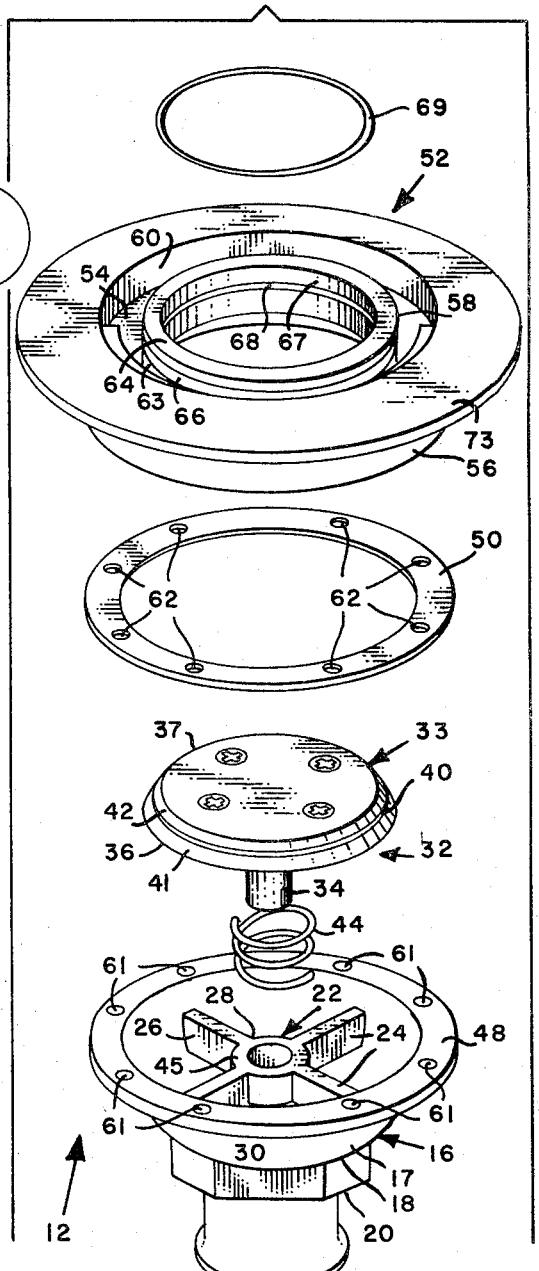
FIG. 3 is an exploded perspective view of one section of the valve of FIGS. 1–2.

In the operation of the valve 10, the receiving assembly 12 and the discharge assembly 14 are initially brought into an interlocking relationship. This is accomplished by the insertion of the wall 90 of the extension portion 86 of the housing section 76 into the channel 60, and into a position in which each of the tongues 96 bears against one of the bosses 74. The wall 58 of the ring 52 will then lie inserted with the channel 92. At the same time, the plunger 114 will be maintained by the bearings 150 in its normal position of retraction, as shown in FIG. 2. During insertion of the wall 90 into the channel 60, each of the locking balls 100 will be contacted by the distal end 64 of the wall 58 will thus be forced into a position of withdrawal from the channel 92 and will be received within one of the depressions 166.

The actuator 156 is then rotated by means of the handles 184 and 186 in a clockwise direction. As a consequence thereof, the surface 164 of the wall portion 160 will come into contact with the locking balls 100 and will cam the latter into their respective positions of insertion within the channel 92. The balls 100 will thereupon become inserted within the groove 66 in the wall 58. The receiving assembly 12 and discharge assembly 14 will thus become locked together.

The actuator 156 is then further rotated in a clockwise direction. As a result thereof, the bearings 150 will be cammed by the slots 176 and 178 and into the inner ends 183 of the latter, respectively. The pin 140 will thus be shifted axially inward. The plunger 114 will, as a result, likewise be caused to move axially inward. The poppet 116 will thus be removed from seated position and will force the valve element 33 from its seat 71 and into an open position. Liquid from the inlet 20 will then flow through the inlet assembly 12, through the outlet assembly 14, and through the outlet 80.

When it is desired to disconnect the valve 10, the reverse of the operations just described are carried out. The actuator 156 is then rotated in a counterclockwise direction. The initial effect will be to cause the plunger 114 to be retracted into the seated position shown in FIG. 2. At the same time, the spring 44, bearing against the valve element 33, will force the latter into the seat 71. Upon further counter-clockwise rotation of the actuator 156, the locking balls 100 will be freed for withdrawal from the groove 66 and for receipt within one of the depressions 164. The outlet assembly 14 can then be removed from its position of engagement with the inlet assembly 12.

Throughout the operation of the valve 10, the O-ring 69 provides a seal between the wall 58 of the inlet assembly 12 and the inner end portion 82 of the wall 78 of the outlet assembly 14. It should, furthermore, be noted that the plunger base 116 and the valve element 33 are normally sealed in seated position by means of the gaskets 124 and 38, respectively. At the same time, the poppet 116 and the valve element 33 lie closely adjacent one another.

In view of the foregoing, it is to be observed that the valve 10 of the present invention is drip-proof. Thus, when the receiving assembly 12 is disconnected from the discharge assembly 14, no liquid remains in either of said assemblies 12 and 14. In addition, no liquid escapes between the two assemblies during flow therethrough. The foregoing advantages result from the operation of the valve 10 in which the assemblies 12 and 14 are locked together prior to movement of the valve member 32 into open position and in which valve member 32 is closed prior to disconnection of the assemblies 12 and 14.

Having thus described my invention, what I claim as new and desire to protect by Letters Patent is:

1. A valve comprising:
   (a) a plurality of valve housing sections;
   (b) means interlocking said sections;
   (c) a valve element positioned in one of said sections, said valve element being maintained normally closed and being movable into an open position;
   (d) valve opening means positioned in another of said sections and movable between respective positions for opening and closing of said valve element; and
   (e) actuating means adapted to cam said valve opening means between said positions for opening and closing of said valve,
   said interlocking means include a groove formed on one of said housing sections, and a plurality of locking balls mounted on the other of said housing sections, each of said locking balls being movable between a locked position of insertion within said groove and an unlocked position of removal from said groove, said actuating means being adapted to cam said locking balls into said locked position, said actuating means being further adapted to release said locking balls from said locked position.

2. A valve as claimed in claim 1, wherein said housing sections are formed with walls having mutually adjacent positions when said sections are interlocked, and comprising sealing means disposed between said walls for the prevention of the passage of liquid between said housing sections.

3. A valve in accordance with claim 2, in which a groove is formed in one of said walls, and comprising an O-ring disposed within said groove, said other wall being adapted to engage said O-ring.

4. A valve in accordance with claim 1, in which said actuating means are adapted to cam said locking balls into said locked position prior to the opening of said valve, said actuating means being further adapted to release said locking balls from the locked portion following the closing of said valve.

5. A valve in accordance with claim 1, in which said valve is maintained in said closed position by spring action.

6. A valve in accordanc with claim 1, in which said valve opening means comprise a plunger, said actuating means including a cam follower secured to said plunger, said actuating means further including a camming surface adapted to engage said cam follower for movement of said plunger.

7. A valve in accordance with claim 6, in which said cam follower is constructed of at least one roller bearing, said actuator being formed with a cam slot corresponding to each roller bearing and adapted to receive the respective roller bearing.

8. A valve in accordance with claim 6, in which said valve is of disc shape, said plunger being provided with a base of disc shape, said base being adapted to bear against said valve for opening of said valve.

9. A valve in accordance with claim 8, in which said valve and said plunger base are normally maintained within two seats, respectively, said valve and said base each being sealed within the respective seat, the seat for said plunger base being positioned immediately adjacent said valve seat.

References Cited

UNITED STATES PATENTS

| | | | |
|---|---|---|---|
| 2,737,401 | 3/1956 | Lindsay | 137—614.06 |
| 2,739,827 | 3/1956 | Krone | 137—614.06 |
| 2,901,008 | 8/1959 | Cavett | 137—614.06 |

CLARENCE R. GORDON, *Primary Examiner.*

HOWARD M. COHN, *Assistant Examiner.*

U.S. Cl. X.R.

285—314